July 26, 1927.
F. J. O'BRIEN
1,637,200
FLEXIBLE PIPE SLIP FOR DRILLING APPARATUS
Filed Jan. 18, 1926
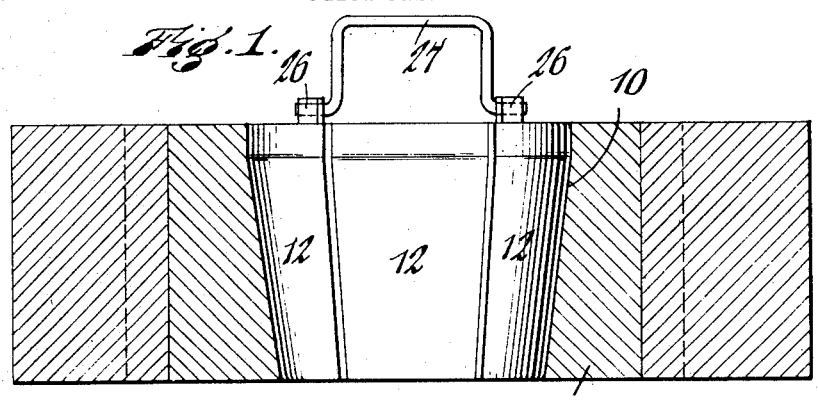
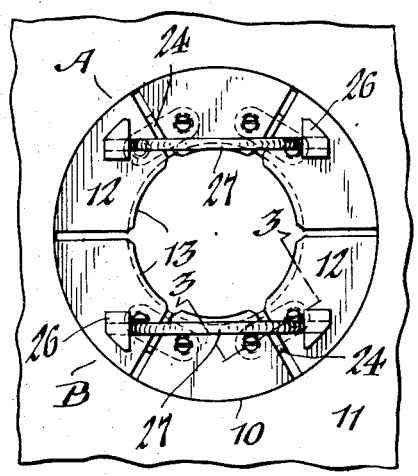
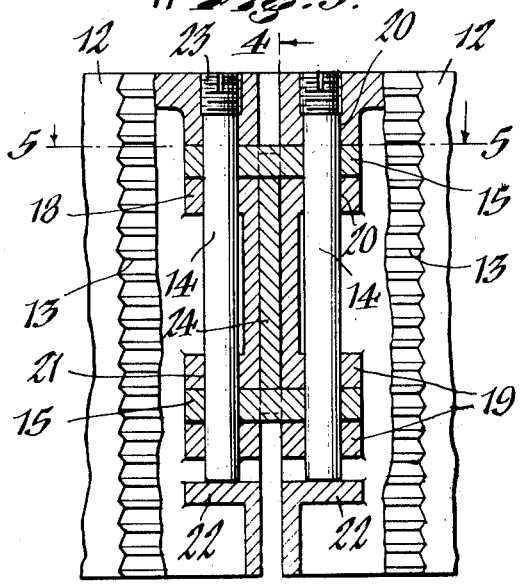
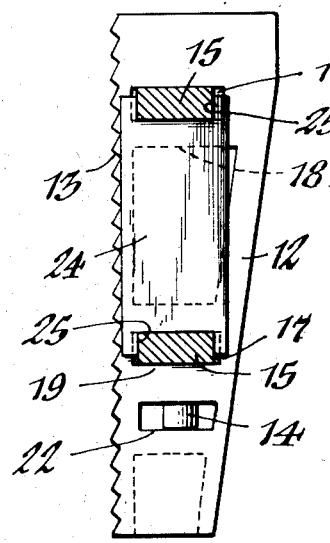
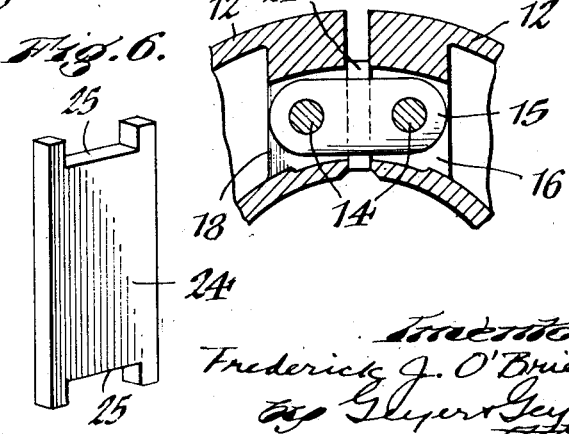
Inventor.
Frederick J. O'Brien, Patented July 26, 1927.

1,637,200

UNITED STATES PATENT OFFICE.

FREDERICK J. O'BRIEN, OF TITUSVILLE, PENNSYLVANIA, ASSIGNOR, BY DIRECT AND MESNE ASSIGNMENTS, OF ONE-HALF TO TITUSVILLE FORGE COMPANY, OF TITUSVILLE, PENNSYLVANIA, A CORPORATION OF MARYLAND, AND ONE-HALF TO EMSCO DERRICK & EQUIPMENT COMPANY, OF LOS ANGELES, CALIFORNIA, A CORPORATION OF CALIFORNIA.

FLEXIBLE PIPE SLIP FOR DRILLING APPARATUS.

Application filed January 18, 1926. Serial No. 82,070.

This invention relates to improvements in the slips or gripping devices used in connection with well drilling apparatus.

Its chief object is to provide a device of this character having simple and inexpensive means for flexibly connecting the sectors thereof so that they are capable of expanding and contracting to a limited extent.

Another object of the invention is the provision of detachable means for limiting the lateral play between the slip-sectors.

With the above and other objects in view, the invention consists in the novel features of construction and arrangement of parts hereinafter referred to and particularly pointed out in the appended claims.

In the accompanying drawings: Figure 1 is a side elevation of the invention showing the same seated in the customary bushing of a supporting table. Figure 2 is a top plan view thereof. Figure 3 is an enlarged transverse vertical section on line 3—3, Fig. 2. Figure 4 is a transverse vertical section on line 4—4, Fig. 3. Figure 5 is a fragmentary horizontal section on line 5—5, Fig. 3. Figure 6 is a perspective view of one of the spacer plates.

Similar characters of reference indicate corresponding parts throughout the several views.

In the preferred embodiment of the invention shown in the drawings, the same comprises a pair of slip units A, B, adapted for engagement with the tapered opening 10 of the customary table or spider bushing 11, the pipe or casing extending through these slip units and suspended from them in the usual manner.

Each of these slip units consists of a series of sectors 12, three being shown in the drawings, which are spaced radially and connected with one another to form a flexible and substantially continuous semi-circular gripping face for engaging one side of the casing. These sectors are of uniform shape and their outer bearing faces are tapered to conform to the conical bushing-opening 10, while their inner gripping faces are provided with threads or wickers 13 to prevent the pipe or casing from slipping downwardly relatively thereto.

The preferred coupling or connection for flexibly joining the sectors of each slip unit with one another consists of a pair of vertical pivot rods or pins 14 carried by the sectors adjacent their radial or opposing lateral sides, and upper and lower horizontal coupling members or links 15 extending across the space between said sectors and pivoted at their ends to the companion pivot rods. Each slip-sector is preferably a hollow structure, being provided in the radial walls thereof with upper and lower recesses 16 and 17, respectively, for receiving the ends of the links 15. The upper recess is formed between the top wall of the respective sector and an inwardly-facing horizontal flange 18 cast thereon, while the lower recess is formed between a pair of similar flanges 19, the several flanges extending transversely of the sector and joined at their ends to the inner and outer faces thereof, as shown in Fig. 5. The top wall of the sector and the flanges 18, 19 are provided with alining vertical openings 20, 21, respectively, through which the corresponding pivot rod 14 extends, the latter resting at its lower end on a flange or abutment 22. The top opening 20 is threaded to receive a set screw 23, which, together with the abutment 22, holds the pivot rod in place and yet permits its ready insertion and removal in assembling and dismembering the slip-sectors.

This construction and arrangement of parts effectually prevents vertical displacement of the sectors relative to one another and affords ample flexibility to adapt the slip units to firmly grip the pipe about its entire circumference without straining or breaking the hinge joints between such sectors. Furthermore, the links or tie-bars 15 maintain the slip-sectors in proper alinement and permit the expansion and contraction of the slip units to render them capable of use with pipes or casings of various diameters within certain limits. It is to be understood that by inserting or removing one or more sectors, the slip-units can be readily converted for use with large or small casings.

For the purpose of limiting the lateral play between the slip-sectors 12, spacer plates 24 may be employed which are adapted to be removably mounted between the opposing walls of adjoining sectors, as shown in Fig. 3. These spacer plates are substantially rectangular in shape and are provided in their upper and lower edges with notches or recesses 25 which engage the upper and lower links 15 in the manner shown in Fig. 4, whereby said plates are held in place.

The outer sectors of each slip unit have lugs 26 thereon for receiving the ends of a suitable handle 27.

I claim as my invention:

1. A casing slip of the character described, comprising a plurality of substantially hollow sectors each including upper and lower sets of spaced inwardly-facing flanges in their lateral faces and containing vertically-alined openings therein, the spaces between said flanges forming recesses opening into the lateral faces of the sectors, pivot rods extending through the openings of said flanges and held against vertical displacement in opposite directions, and upper and lower links connecting adjoining sectors and fulcrumed on the pivot rods thereof, the ends of said links engaging the opposing recesses of the sectors.

2. A casing slip of the character described, comprising a plurality of substantially hollow sectors, each including upper and lower sets of spaced inwardly-facing flanges in their lateral faces and containing vertically-alined openings therein, the spaces between said flanges forming recesses opening into the lateral faces of the sectors, each of said sectors also having an abutment below the lower set of flanges, pivot rods extending through the openings of said flanges and bearing at their lower ends on the corresponding abutments, means for removably retaining said pivot rods in their sectors, and upper and lower links connecting adjoining sectors and fulcrumed on the pivot rods thereof, the ends of said links engaging the opposing recesses of the sectors.

3. A casing slip of the character described, comprising a plurality of radially-spaced sectors, upper and lower horizontal links pivotally connecting adjoining sectors, and plates arranged in the spaces between said sectors, the upper and lower edges of said plates having notches engaging the corresponding links.

FREDERICK J. O'BRIEN.